(12) United States Patent  
de Souza et al.

(10) Patent No.: US 11,023,802 B2
(45) Date of Patent: Jun. 1, 2021

(54) BATTERY-BASED NEURAL NETWORK WEIGHTS

(71) Applicant: INTERNATIONAL BUSINESS MACHINES CORPORATION, Armonk, NY (US)

(72) Inventors: Joel P. de Souza, Putnam Valley, NY (US); Yun Seog Lee, White Plains, NY (US); Ning Li, White Plains, NY (US); Devendra K. Sadana, Pleasantville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 386 days.

(21) Appl. No.: 15/803,957

(22) Filed: Nov. 6, 2017

(65) Prior Publication Data

US 2018/0260684 A1    Sep. 13, 2018

Related U.S. Application Data

(63) Continuation of application No. 15/457,379, filed on Mar. 13, 2017.

(51) Int. Cl.
*G06N 3/04*     (2006.01)
*G06N 3/063*    (2006.01)
(Continued)

(52) U.S. Cl.
CPC ............. *G06N 3/04* (2013.01); *G06N 3/063* (2013.01); *G06N 3/0635* (2013.01); *G06N 3/084* (2013.01); *H01M 10/00* (2013.01)

(58) Field of Classification Search
CPC ........ G06N 3/04; G06N 3/063; G06N 3/0635; G06N 3/084; H01M 10/00; H01L 45/04–16
See application file for complete search history.

(56) References Cited

U.S. PATENT DOCUMENTS 9,818,057 B2    11/2017  Nishitani et al.
2009/0067229 A1  3/2009  Kang et al.
(Continued)

FOREIGN PATENT DOCUMENTS

CN      105862012 A   *   8/2016

OTHER PUBLICATIONS

Adhikari, Memristor Bridge Synapse-Based Neural Network and Its Learning, 2012, IEEE (Year: 2012).*

(Continued)

*Primary Examiner* — Vincent Gonzales
(74) *Attorney, Agent, or Firm* — Tutunjian & Bitetto, P.C.; Kristofer Haggerty

(57) ABSTRACT

Methods for controlling the resistance of a controllable resistive element include determining an amount of electrical resistance change for the controllable resistive element. A concentration difference is determined for a charge carrier ion in a resistor layer of the controllable resistance element that corresponds to the electrical resistance change for the controllable resistive element. A duration and amplitude of a current pulse is determined that changes the charge carrier ion concentration by the determined difference. A positive or negative current pulse is applied to a controllable resistive element for the determined duration.

9 Claims, 10 Drawing Sheets

(51) Int. Cl.
*G06N 3/08* (2006.01)
*H01M 10/00* (2006.01)

(56) References Cited

U.S. PATENT DOCUMENTS

| | | | |
|---|---|---|---|
| 2012/0319074 A1* | 12/2012 | Fujii | H01L 27/2436 257/4 |
| 2017/0083813 A1 | 3/2017 | Augustine et al. | |
| 2018/0060726 A1 | 3/2018 | Gokmen et al. | |

OTHER PUBLICATIONS

Wang et al, Delayed Switching in Memristors and Memristive Systems, 2010, IEEE electron device letters vol. 31 No. 7 p. 755 (Year: 2010).*

Liu et al, An Adaptive Recurrent Neural Network for Remaining Useful Life Prediction of Lithium-ion Batteries, Jan. 2010, Annual Conference of the Prognostics and Health Management Society (pp. 1-10).

Mai et al, Memristive and neuromorphic behavior in a LixCoO2 nanobattery, Jan. 2015, Scientific Reports (pp. 1-6).

U.S. Final Office Action issued in U.S. Appl. No. 15/457,379, dated Mar. 3, 2020, pp. 1-14.

* cited by examiner

BATTERY-BASED NEURAL NETWORK WEIGHTS

BACKGROUND

Technical Field

The present invention generally relates to neural networks and, more particularly, to the use of batteries to control weights in an artificial neural network.

Description of the Related Art

An artificial neural network (ANN) is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

Referring now to FIG. 1, a generalized diagram of a neural network is shown. ANNs demonstrate an ability to derive meaning from complicated or imprecise data and can be used to extract patterns and detect trends that are too complex to be detected by humans or other computer-based systems. The structure of a neural network is known generally to have input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There may be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

SUMMARY

A method for adjusting the electrical resistance of a controllable resistive element includes determining an amount of electrical resistance change for the controllable resistive element. A concentration difference for a charge carrier ion in a resistor layer of the controllable resistance element is determined that corresponds to the electrical resistance change for the controllable resistive element. A duration and amplitude of a current pulse is determined that changes the charge carrier ion concentration by the determined difference. A positive or negative current pulse is applied to a controllable resistive element for the determined duration.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention implement the weights of an artificial neural network (ANN) using battery chemistry to alter the resistance of a resistive element. The battery structure has a linear relationship between charge carrier ion concentration in a cathode layer and stored charge for at least part of its operational range. This property is used to precisely control the charge carrier ion concentration of the cathode layer, which in turn is used to control an electrical resistance through the weight element. In addition, the resulting weights are non-volatile and have symmetric bidirectionality, where equal positive and negative current pulses change the state of the battery in respective directions by equal amounts.

Figure 1:
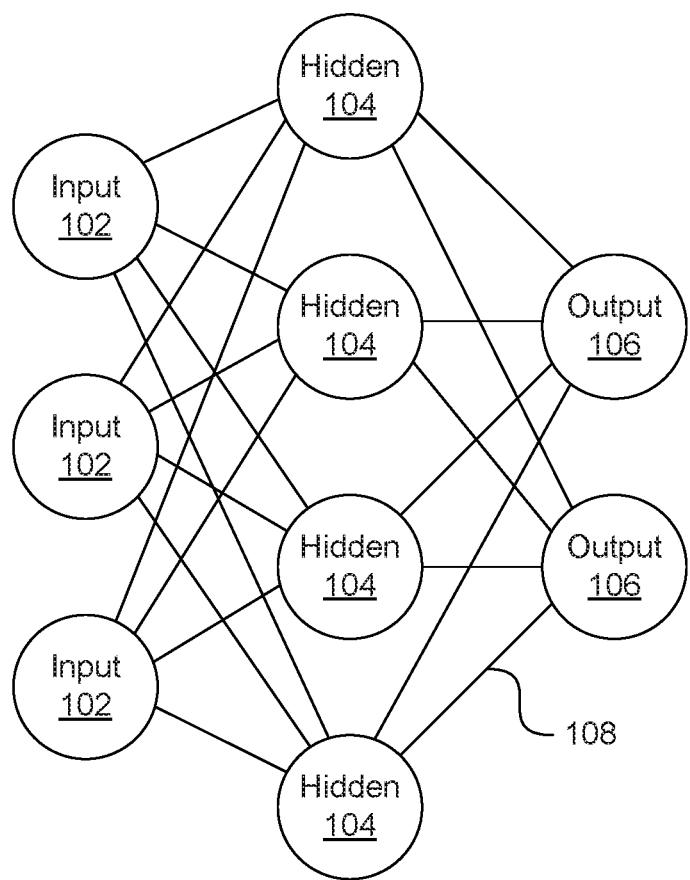
FIG. 1 is a diagram of a neural network.
Figure 2:
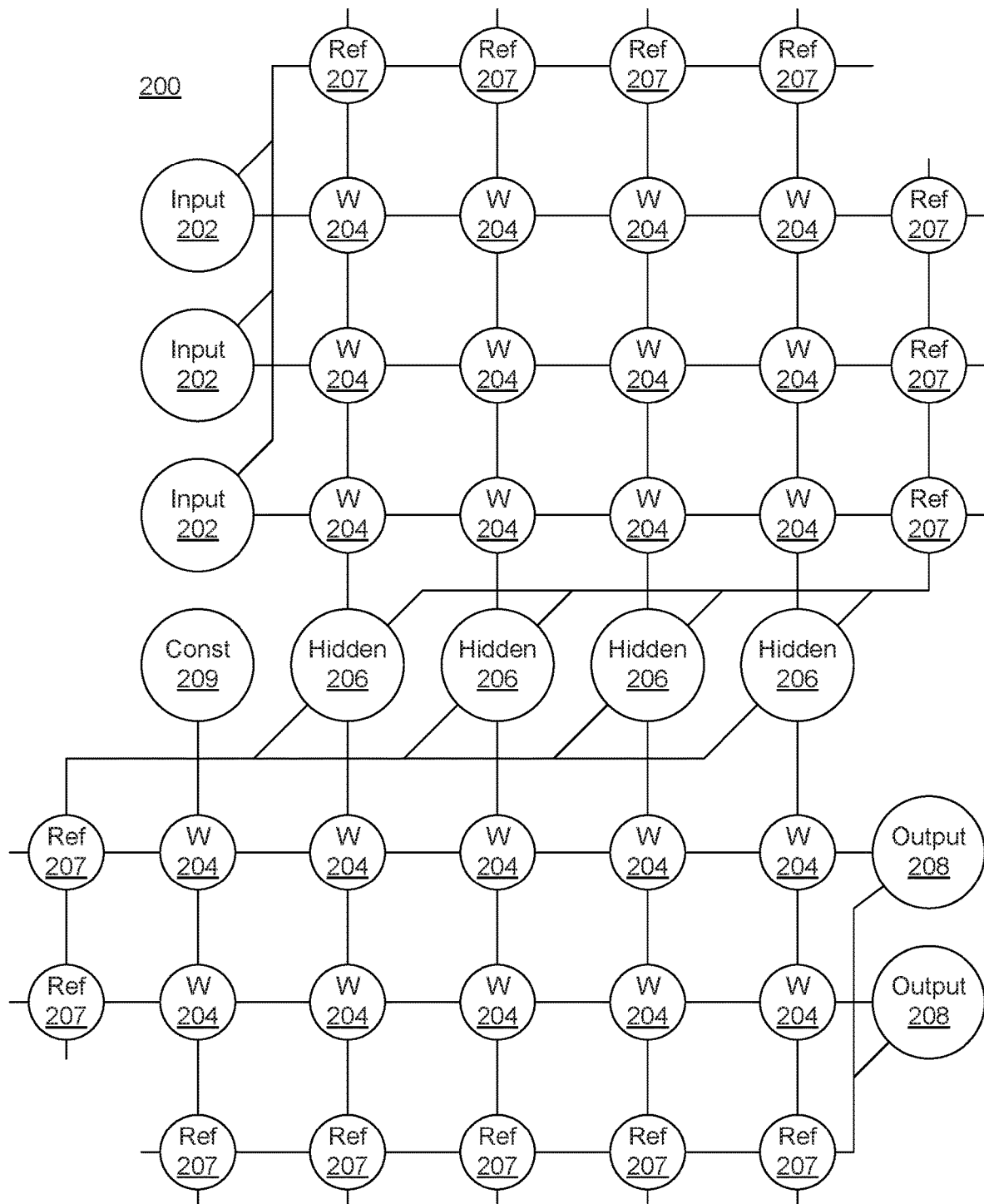
FIG. 2 is a diagram of a neural network having weights initialized to provide dedicated neurons for certain states in accordance with the present principles.

Referring now to the drawings in which like numerals represent the same or similar elements and initially to FIG. 2, an artificial neural network (ANN) architecture 200 is shown. It should be understood that the present architecture is purely exemplary and that other architectures or types of neural network may be used instead. During feed-forward operation, a set of input neurons 202 each provide an input voltage in parallel to a respective row of weights 204. The weights 204 each have a settable resistance value, such that a current output flows from the weight 204 to a respective hidden neuron 206 to represent the weighted input. The current output by a given weight is determined as $I = v/r$, where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. The reference weight 207 can also be attach outside of the array, where computation is done between an output of input layer to an input of hidden layer.

As an alternative to using the reference weights 207, another embodiment may use separate arrays of weights 204 to capture negative values. Each approach has advantages and disadvantages. Using the reference weights 207 is more efficient in chip area, but reference values need to be matched closely to one another. In contrast, the use of a separate array for negative values does not involve close matching as each value has a pair of weights to compare against. However, the negative weight matrix approach uses roughly twice the chip area as compared to the single reference weight column. In addition, the reference weight column generates a current that needs to be copied to each neuron for comparison, whereas a negative matrix array provides a reference value directly for each neuron. In the negative array embodiment, the weights 204 of both positive and negative arrays are updated, but this also increases signal-to-noise ratio as each weight value is a difference of two conductance values. The two embodiments provide identical functionality in encoding a negative value and those having ordinary skill in the art will be able to choose a suitable embodiment for the application at hand.

The hidden neurons 206 use the currents from the array of weights 204 and the reference weights 207 to perform some calculation. The hidden neurons 206 then output a voltage of their own to another array of weights 207. This array performs in the same way, with a column of weights 204 receiving a voltage from their respective hidden neuron 206 to produce a weighted current output that adds row-wise and is provided to the output neuron 208.

It should be understood that any number of these stages may be implemented, by interposing additional layers of arrays and hidden neurons 206. It should also be noted that some neurons may be constant neurons 209, which provide a constant voltage to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 provide combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

Figure 3:
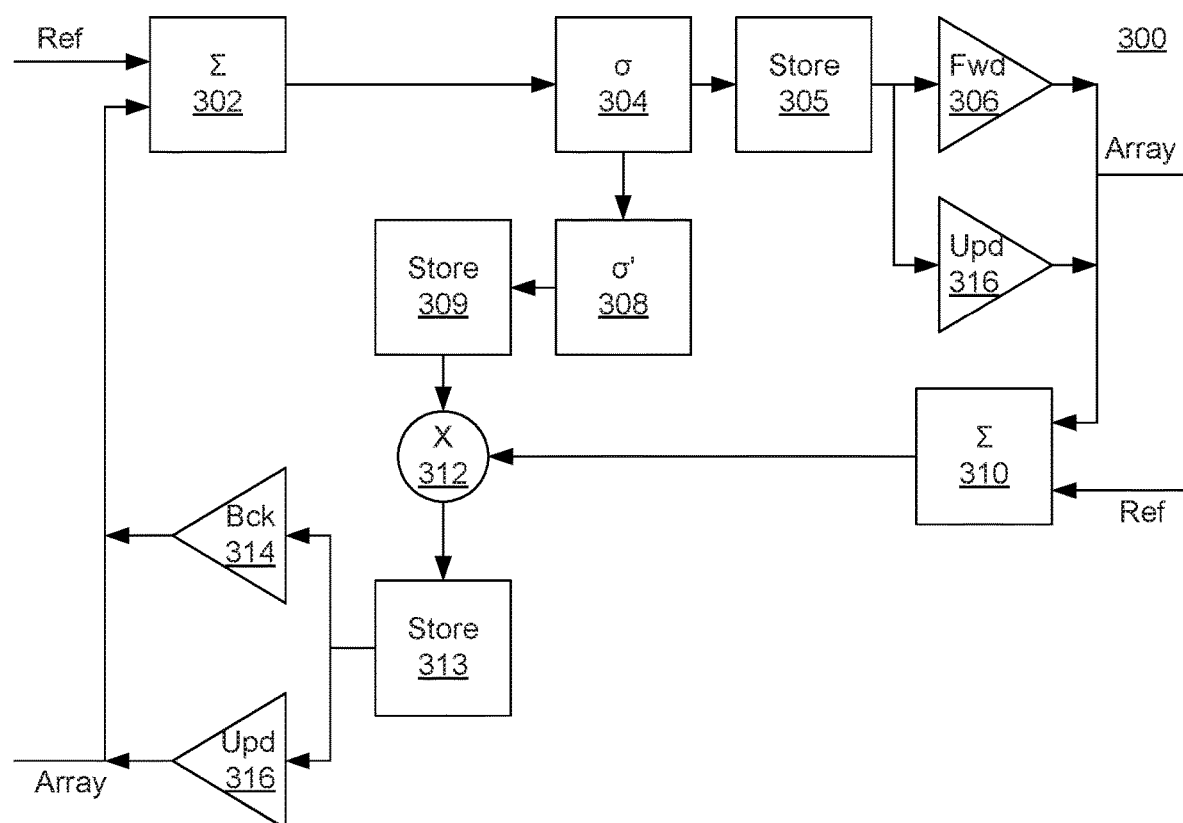
FIG. 3 is a block diagram of circuitry for reading from, writing to, and training a neural network in accordance with the present principles.

Referring now to FIG. 3, a block diagram of a neuron 300 is shown. This neuron may represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within in the neuron 300 to control which components are active. It should therefore be understood that there may be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and may be implemented as analog or digital circuitry or may be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal may be generated at an output neuron 208 or may be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In some embodiments, the weights 204 may be implemented in software or in hardware, using relatively complicated weighting circuitry or using resistive cross point devices. Such resistive devices may have switching characteristics that have a non-linearity that can be used for processing data. The weights 204 may belong to a class of device called a resistive processing unit (RPU) and may be used to perform calculations in the neural network 200. The RPU devices may be implemented with resistive random access memory (RRAM), phase change memory (PCM), programmable metallization cell (PMC) memory, or any other device that has non-linear resistive switching characteristics. It is particularly contemplated that the RPU devices may be implemented as voltage-controlled resistors with the voltage being set by charge stored on a battery. Such RPU devices may also be considered as memristive systems.

Figure 4:
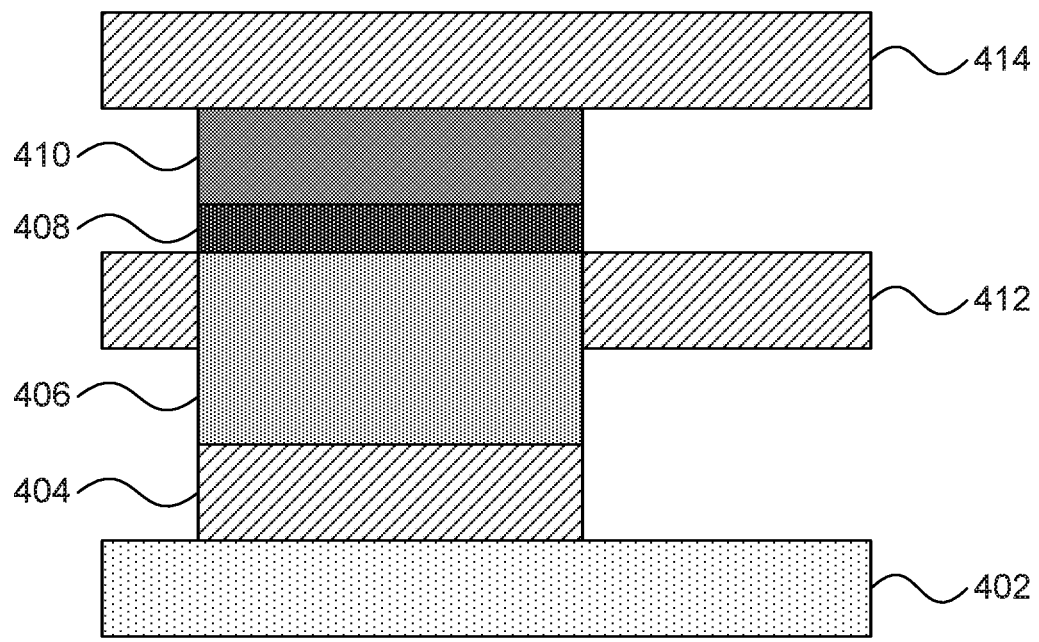
FIG. 4 is a side view of a controllable resistive element based on a thin-film battery structure in accordance with the present principles.

Referring now to FIG. 4, a side view of an exemplary weight 204 structure is shown. A shared read/write electrode 404 is formed on a substrate 402. Although it is specifically contemplated that the substrate 402 may be a semiconductor substrate, and although the present embodiments are specifically directed to such a structure, it should be understood that alternative substrate materials may include, e.g., glass, sapphire, or any other appropriate, non-conductive material that is resistant to charge carrier ion diffusion. A semiconductor substrate may be a bulk-semiconductor substrate. In one example, the bulk-semiconductor substrate may be a silicon-containing material. Illustrative examples of silicon-containing materials suitable for the bulk-semiconductor substrate include, but are not limited to, silicon, silicon germanium, silicon germanium carbide, silicon carbide, polysilicon, epitaxial silicon, amorphous silicon, and multi-layers thereof. Although silicon is the predominantly used semiconductor material in wafer fabrication, alternative semiconductor materials can be employed, such as, but not limited to, germanium, gallium arsenide, gallium nitride, cadmium telluride, and zinc selenide. Although not depicted in the present figures, the semiconductor substrate may also be a semiconductor on insulator (SOI) substrate.

The shared electrode 404 may be formed from any appropriate conducting material that does not react with a charge carrier ions in the battery structure. In embodiments that employ lithium ion chemistries, the shared electrode 404 may be formed from, e.g., nickel, copper, platinum, etc.

A battery stack is formed on the shared electrode 404. In one particular embodiment, the battery stack may form a thin-film lithium ion battery that includes resistor layer 406. The resistor layer 406 may be formed from an appropriate lithium-containing material such as, e.g., $LiCoO_2$, $LiNbO_3$, $LiMnO_2$, $LiV_2O_5$, $LiFePO_4$, $LiNi_xMn_yCo_z$, $V_2O_5$—$LiBO_2$, $Li_4Ti_5O_{12}$, $Li_xAl$, $Li_xC$, or $Li_xSi$ may be used instead. The material of the resistor layer 406 should have an electrical resistivity controlled by its charge carrier ion concentration, which characterizes the resistance of the cell as the stored charge changes.

An electrolyte layer 408 separate the resistor layer 406 from a reservoir layer 410. It is specifically contemplated that the electrolyte layer 408 may be formed from a solid electrolyte material such as, e.g., lithium phosphorous oxynitride (LiPON), but alternative materials may be used instead. In other embodiments, an organic material-based electrolyte may be used in conjunction with a non-conductive separator between the resistor layer 406 and the reservoir layer 410. The electronic conductivity of the electrolyte layer 408 should be low to improve retention time and, hence, increase stability. The reservoir layer 410 may be formed from any appropriate lithium compound material such as, e.g., $LiCoO_2$, $LiNbO_3$, $LiMnO_2$, $LiV_2O_5$, $LiFePO_4$, $LiNi_xMn_yCo_z$, $V_2O_5$—$LiBO_2$, $Li_4Ti_5O_{12}$, $Li_2TiO_3$, $Li_xAl$, $Li_xC$, Li, or $Li_xSi$. In an exemplary embodiment, the thickness of the resistor layer 406, the electrolyte layer 408, and the reservoir layer 410 may each be between about 5 nm and about 2 μm.

Each layer of the battery structure may be formed by any appropriate deposition method including, e.g., chemical vapor deposition (CVD), physical vapor deposition (PVD), atomic layer deposition (ALD), or gas cluster ion beam (GCIB) deposition. CVD is a deposition process in which a deposited species is formed as a result of chemical reaction between gaseous reactants at greater than room temperature (e.g., from about 25° C. about 900° C.). The solid product of the reaction is deposited on the surface on which a film, coating, or layer of the solid product is to be formed. Variations of CVD processes include, but are not limited to, Atmospheric Pressure CVD (APCVD), Low Pressure CVD (LPCVD), Plasma Enhanced CVD (PECVD), and Metal-Organic CVD (MOCVD) and combinations thereof may also be employed. In alternative embodiments that use PVD, a sputtering apparatus may include direct-current sputtering, pulsed direct-current sputtering, radio frequency sputtering, magnetron sputtering, or ionized metal plasma sputtering. In alternative embodiments that use ALD, chemical precursors react with the surface of a material one at a time to deposit a thin film on the surface. In alternative embodiments that use GCIB deposition, a high-pressure gas is allowed to expand in a vacuum, subsequently condensing into clusters. The clusters can be ionized and directed onto a surface, providing a highly anisotropic deposition.

A write electrode 414 is formed on the reservoir layer 410. The write electrode 414 is formed with a conductive material that, like the shared electrode 404, does not react with the charge carrier of the reservoir layer 410. The write electrode 414 may be formed from the same material as the shared electrode 404 or may be formed from a different conductive material.

A read electrode 412 is formed in contact with the resistor layer 406, at a top portion of the resistor layer 406. The read electrode 412 is formed with a conductive material that, like the shared electrode 404 and the write electrode 414, does not react with the charge carrier ions of the resistor layer 406. The read electrode 412 may be formed from the same material as the shared electrode 404 or the write electrode 414 or may be formed from a different conductive material.

Conductivity of charge carrier ions through the electrolyte layer 408 into a steady state should be fast enough to support the cycle time of the neural network, such that changes made to the states of the weights 204 settle before a read operation is performed. Furthermore, charging and discharging times for a given amount of charge should be as symmetric as possible.

Although the thin-film lithium-ion battery chemistry described above can be made particularly small and is thus suitable for integrating in a hardware-based ANN, other types of batteries may be used instead. Alternative battery chemistries include potassium- or sodium-based batteries, nickel-zinc batteries, and rechargeable alkaline batteries. As long as the battery structure supplies predictable voltages relative to the charge and discharge times supplied by write signals, the battery structure can be used to control the resistance of the weight 204.

During a write operation, a current pulse is applied between the write electrode 414 and the shared electrode 404. The voltage difference between the two electrodes causes charge carriers in the resistor layer 406 and the reservoir layer 408 to move. If a lithium ion battery chemistry is used, and a lower voltage is present on the write electrode 414 than on the shared electrode 404, then positively charged Li+ ions move from the resistor layer 406, across the electrolyte layer 408, and into the reservoir layer 410. If a reverse current pulse is applied between the write electrode 414 and the shared electrode 404, the charge carrier ions leave the reservoir layer 410 and accumulate in the resistor layer 406. The duration of the current pulse determines how many charge carrier ions pass through the electrolyte layer 408.

The concentration of charge carriers in the resistor layer 406 determines the resistance of the resistor layer 406. As will be shown below, a precise correspondence between this concentration x and the resistance can be determined. As a result, the resistance of the resistor layer 406 can be precisely controlled by controlling the charge carrier ion concentration.

During a read operation, a voltage is applied to the read electrode 412 and a current is measured at the shared electrode 404. The current is determined by Ohm's law, $I=V/R$, where V is the voltage applied to the read electrode 412 and R is the resistance of the resistor layer 406. Thus, the measured current and the known read voltage determine the resistance of the resistor layer 406 and thereby the value stored in the weight 204.

Figure 5:
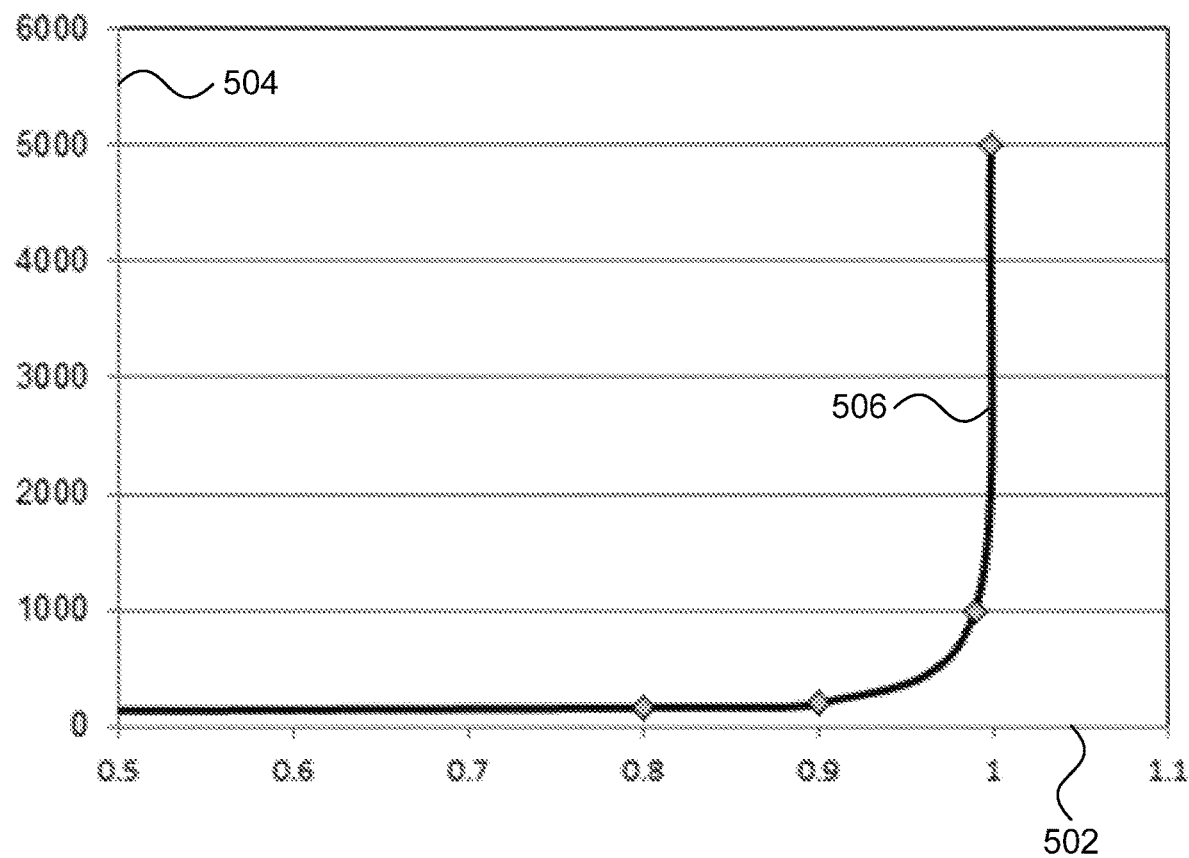
FIG. 5 is a graph illustrating a relationship between charge carrier ion density and resistance in a controllable resistance element in accordance with the present principles.

Referring now to FIG. 5, a graph of the relationship between lithium ion concentration and resistivity for an exemplary weight 204 is shown. In this particular example, the resistor layer 406 is formed from $Li_xCoO_2$. The horizontal axis 502 represents the value of x and characterizes the relative concentration of lithium ions in the resistor layer 406. The vertical axis 504 represents the resistivity of the resistor layer 406, measured in ohm-meters. The relationship between the resistivity of the resistor layer 406 and the resistance it presents during a read operation on the weight 204 is $R=\rho \cdot l/A$, where $\rho$ is the resistivity of the material, l is the length of the resistor layer 406 along a direction of current flow, and A is a cross-sectional area of the resistor layer 406 perpendicular to the direction of current flow.

As can be seen from the graph, using this particular composition in the resistor layer 406, there is a range of lithium ion concentrations on the line 506 between about 0.9 and about 1 where different concentrations can be readily distinguished by the resistivity values they produce. Because the concentration of lithium ions in the resistor layer 406 can be precisely controlled, the resistivity, and thus the resistance, can similarly be controlled.

Figure 6:
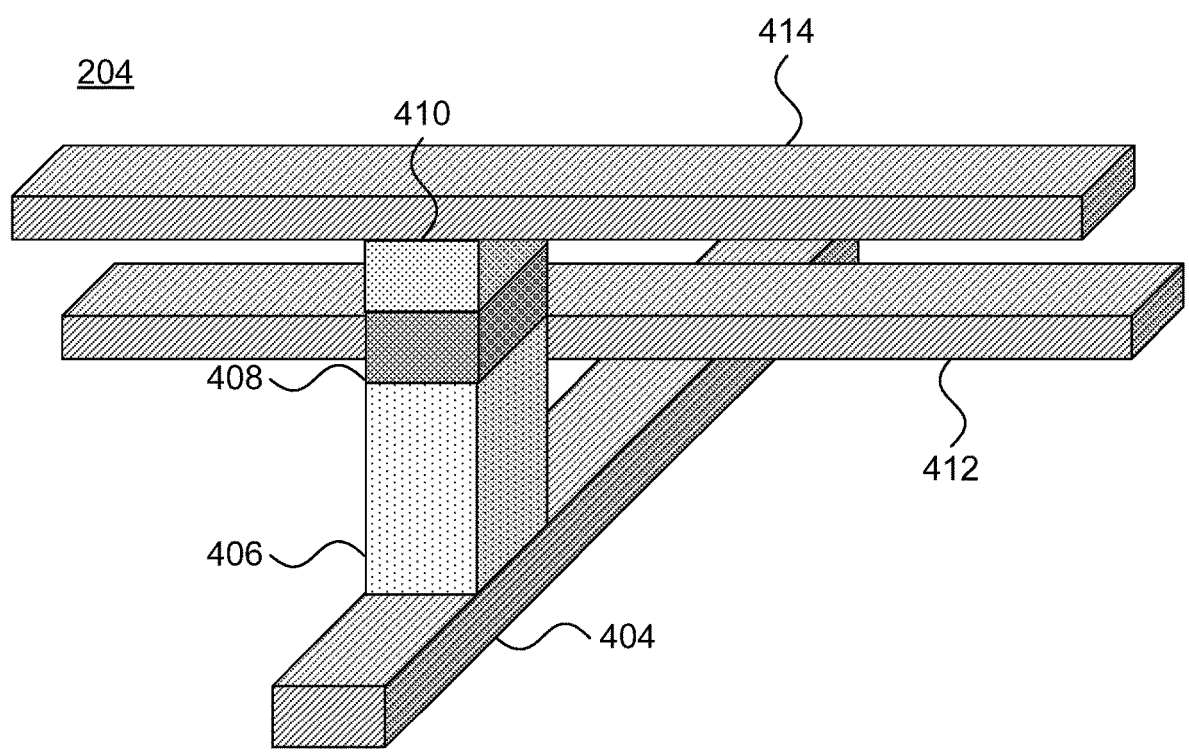
FIG. 6 is an isometric view of a controllable resistive element in accordance with the present principles.

Referring now to FIG. 6, a three-dimensional view of the weight 204 is shown. This view emphasizes the positioning and spatial relationships of the electrodes. The read electrode 412 and the write electrode 414 are depicted as being parallel while the shared electrode 404 is perpendicular to the other two electrodes, but it should be understood that alternate embodiments may orient the electrodes in any appropriate direction.

The battery structure, formed from the resistor layer 406, the electrolyte layer 408, and the reservoir layer 410, is positioned directly between the shared electrode 404 and the write electrode 414 at a point where the two electrodes overlap. The read electrode 412 is shown as being in contact with a sidewall of the resistor layer 406 at a top portion of the resistor layer 406. The read electrode 412 should be positioned on the sidewall to prevent the read electrode 412 from interfering with the flow of charge carriers into and out of the resistor layer 406.

Figure 7:
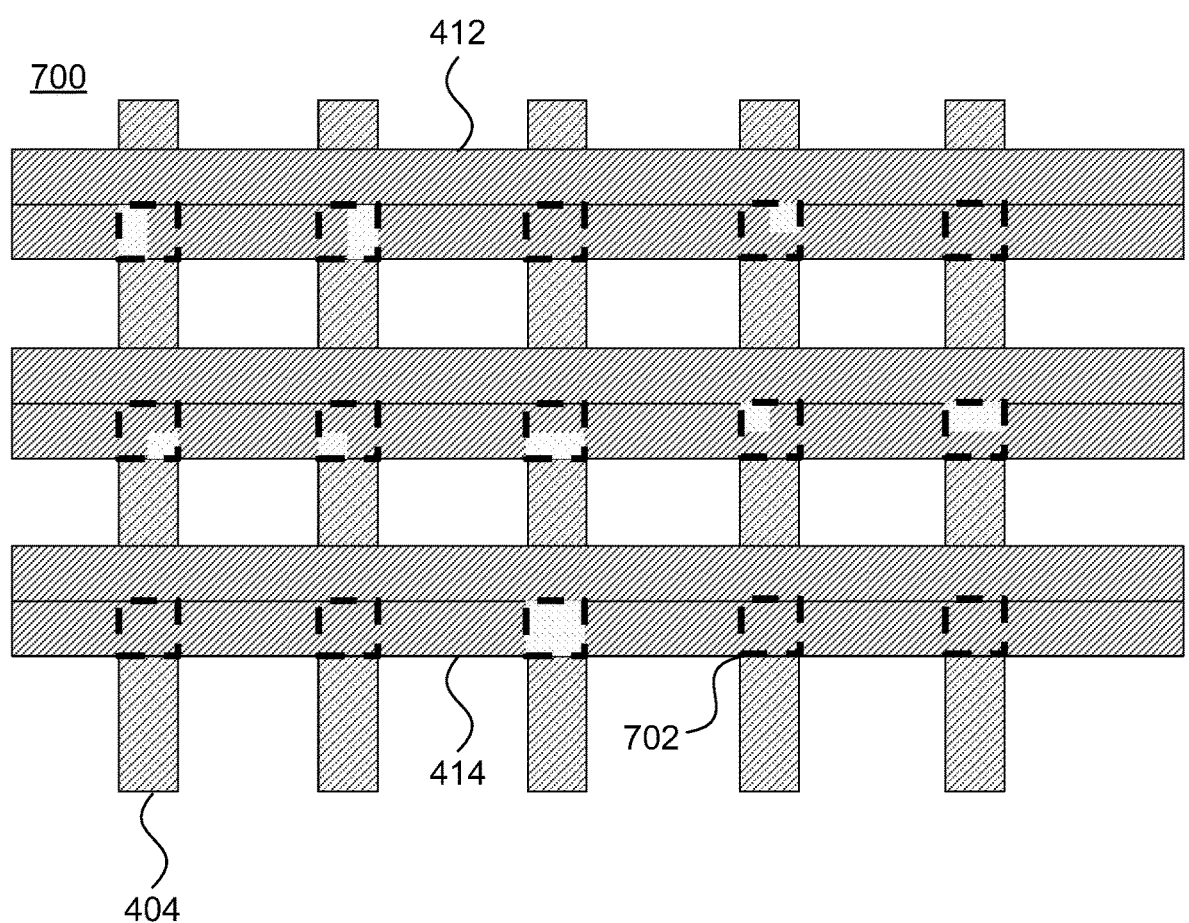
FIG. 7 is a top-down view of an array of controllable resistive elements in accordance with the present principles.

Referring now to FIG. 7, a top-down view of an array of weights 700 is shown. The battery structures 702 are shown as dotted lines at the overlapping points between the shared electrodes 404 and the write electrodes 414, with the read electrodes 412 being positioned at the sides of the battery structures 702.

Addressing a particular weight 204 for a write operation includes emitting a current pulse between the respective write electrode 414 and the shared electrode 404 associated with the battery structure 702 in question. The charge carrier ions (e.g., lithium ions) make a transition in the battery structure 702 for the duration of the current pulse, causing the electrical resistance state of the resistor layer in the battery structure 702 to change. During a read operation for a particular weight 204, a voltage is applied on the respective read electrode 412 and a resulting current is measured on the respective shared electrode 404. It should be noted that the read operation does not change the resistance state of the resistor layer 406—because the path between the read electrode 412 and the shared electrode 404 passes solely through the resistor layer 406, no charge carrier ions move to or from the reservoir layer 410.

Figure 8:
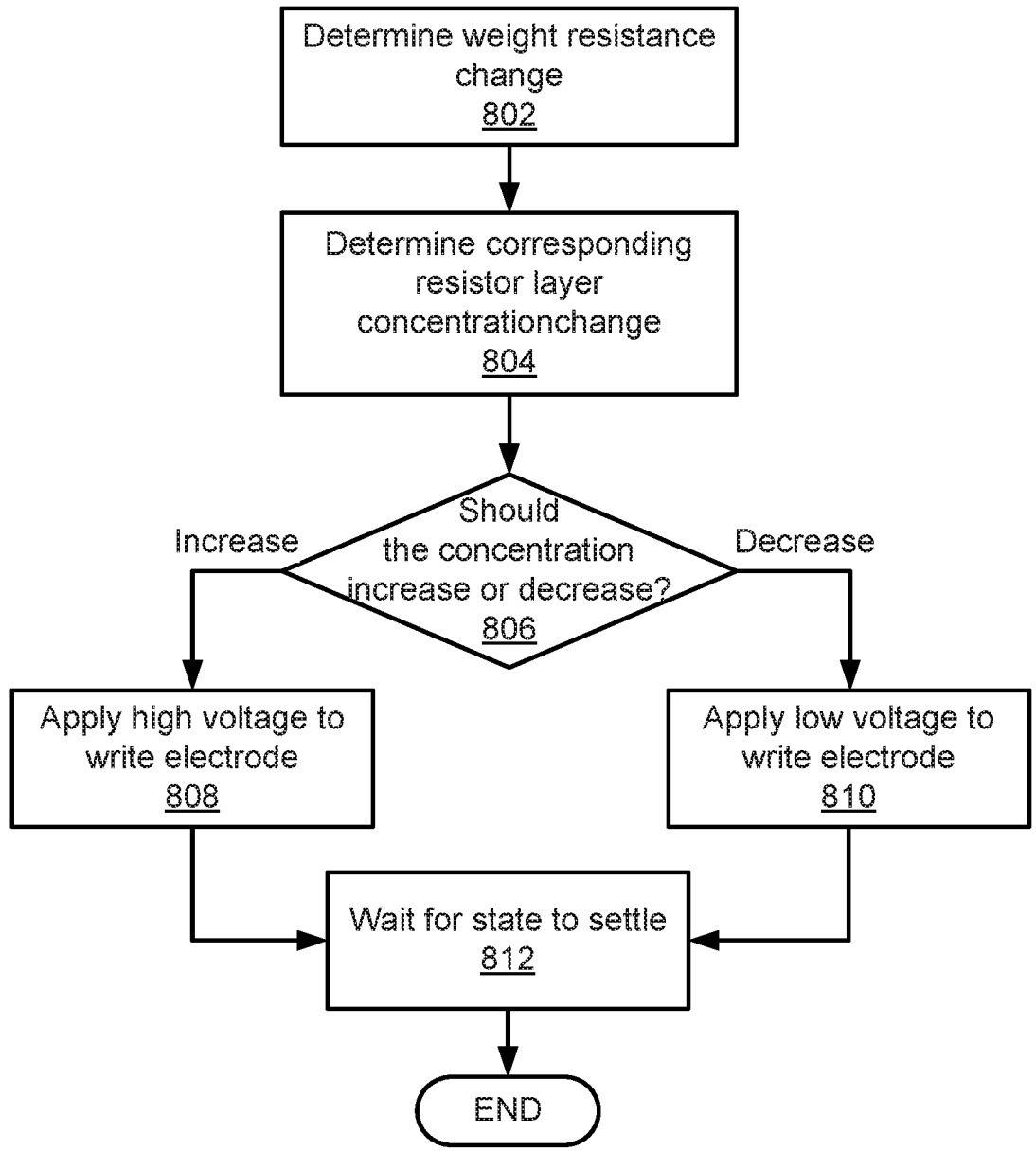
FIG. 8 is a block/flow diagram of a method of controlling a resistance of a controllable resistive element in accordance with the present principles.

Referring now to FIG. 8, a method for writing to the state of a weight 204 is shown. This process may be performed during training of an ANN to adjust the values of any weights 204 and to bring the output of the ANN closer to the expected trained output. Block 802 determines the weight resistance change for each weight 204 that is needed according to a difference between the ANN's output and the expected output from a training corpus. Block 804 determines how much the concentration of charge carrier ions in the resistor layer 406 needs to change to create the target electrical resistance.

Block 806 determines whether the change in concentration reflects an increase in the concentration of charge carrier ions in the resistor layer 406 or a decrease in such concentration. If an increase in concentration is needed, a current pulse is applied between the write electrode 414 and the shared electrode 404. The current pulse has a duration calculated to move the determined concentration of charge carrier ions from the reservoir layer 410 to the resistor layer 406. If a decrease in concentration is needed, a reverse current pulse is applied between the write electrode 414 and the shared electrode 404. The current pulse has a duration calculated to move the determined concentration of charge carriers from the resistor layer 406 and into the reservoir layer 410.

After the concentration in the resistor layer 406 has either increased or decreased, block 812 waits for the battery state to settle. The battery structure 702 needs a small amount of time for the stored charges to diffuse to a steady state. Once this time has elapsed, the weight 204 will provide the correct electrical resistance value and can be used for ANN calculations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B)

only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clear indica s otherwise. It will be further understood that the terms "comprises," "comprising," "includes" and/or "including," when used herein, specify the presence of stated features, integers, steps, operations, elements and/or components, but do not preclude the presence or addition of one or more e features, integers, steps, operations, elements, components and/or groups thereof.

Figure 9:
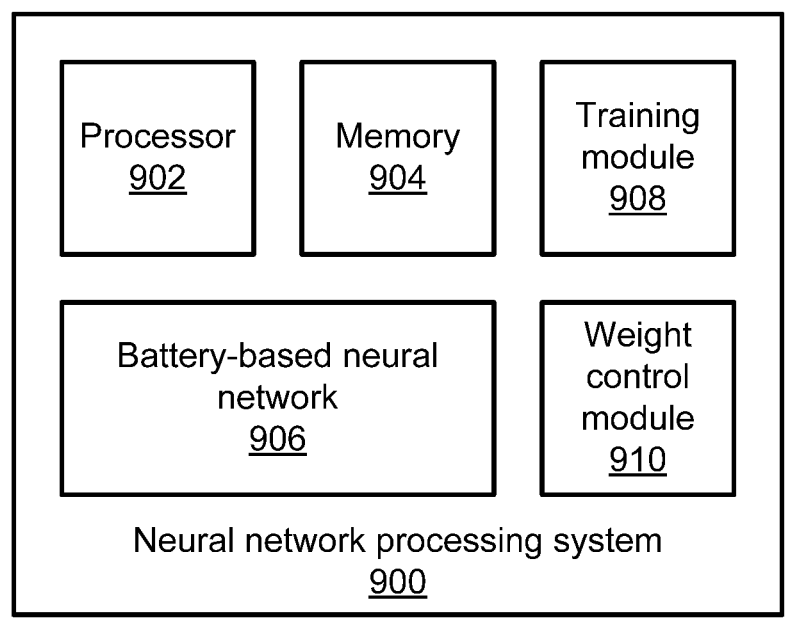
FIG. 9 is a block diagram of a neural network processing system in accordance with the present principles.

Referring now to FIG. 9, a neural network processing system 900 is shown. The neural network processing system 900 includes a hardware processor 902 and a memory 904. A battery-based neural network 906 includes a set of input neurons 202, one or more sets of hidden neurons 206, and a set of output neurons 208, with battery-controlled variable resistive weights 204 as described above. In addition, the neural network processing system 900 includes functional modules that may be implemented as software that is stored in memory 904 and executed by processor 902. In alternative embodiments, the functional modules may be implemented as one or more discrete hardware components in the form of, e.g., an application-specific integrated chip or field programmable gate array.

For example, a training module 908 uses training data that is stored in the memory 904 to train the battery-based neural network 906. As the training module 708 processes the training data, the training module 908 determines errors between the neural network output and the expected results. These errors are used as a basis for updates to the weights 204 of the battery-based neural network 906. A weight control module 910 alters the resistance values of the weights 904 in the battery-based neural network 906 as described above, issuing write and erase signals to the weights 904 as needed.

Figure 10:
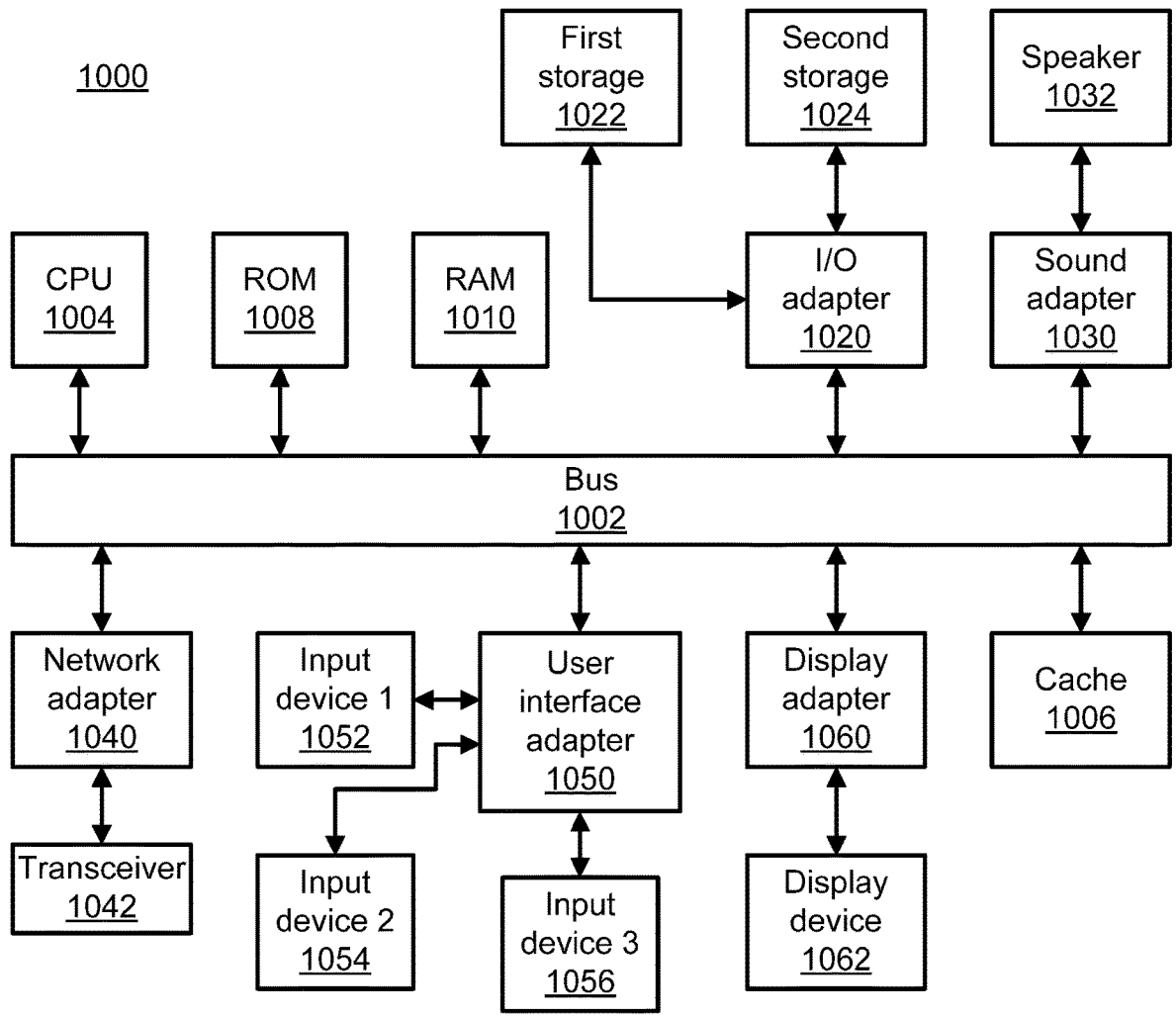
FIG. 10 is a block diagram of a processing system in accordance with the present principles.

Referring now to FIG. 10, an exemplary processing system 1000 is shown which may represent elements of the neural network processing system 900. The processing system 1000 includes at least one processor (CPU) 1004 operatively coupled to other components via a system bus 1002. A cache 1006, a Read Only Memory (ROM) 1008, a Random Access Memory (RAM) 1010, an input/output (I/O) adapter 1020, a sound adapter 1030, a network adapter 1040, a user interface adapter 1050, and a display adapter 1060, are operatively coupled to the system bus 1002.

A first storage device 1022 and a second storage device 1024 are operatively coupled to system bus 1002 by the I/O adapter 1020. The storage devices 1022 and 1024 can be any of a disk storage device (e.g., a magnetic or optical disk storage device), a solid state magnetic device, and so forth. The storage devices 1022 and 1024 can be the same type of storage device or different types of storage devices.

A speaker 1032 is operatively coupled to system bus 1002 by the sound adapter 1030. A transceiver 1042 is operatively coupled to system bus 1002 by network adapter 1040. A display device 1062 is operatively coupled to system bus 1002 by display adapter 1060.

A first user input device 1052, a second user input device 1054, and a third user input device 1056 are operatively coupled to system bus 1002 by user interface adapter 1050. The user input devices 1052, 1054, and 1056 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 1052, 1054, and 1056 can be the same type of user input device or different types of user input devices. The user input devices 1052, 1054, and 1056 are used to input and output information to and from system 1000.

Of course, the processing system 1000 may also include other elements (not shown), as readily contemplated by one of skill in the art, as well as omit certain elements. For example, various other input devices and/or output devices can be included in processing system 1000, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 1000 are readily contemplated by one of ordinary skill in the art given the teachings of the present principles provided herein.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for adjusting the electrical resistance of a controllable resistive element, comprising:
   determining an amount of electrical resistance change for the controllable resistive element;
   determining a concentration difference for a charge carrier ion in a resistor layer of the controllable resistive element that corresponds to the electrical resistance change for the controllable resistive element;
   determining a duration and amplitude of a current pulse that changes the charge carrier ion concentration by the determined difference;
   applying a positive or negative current pulse to a controllable resistive element for the determined duration, thereby causing charge carrier ions to travel through an electrolyte layer of the controllable resistive element, to or from the resistor layer; and
   waiting a predetermined time before applying a read voltage to the controllable resistive element to allow charge carrier ions in the resistor layer to settle.

2. The method of claim 1, wherein applying the positive or negative current pulse comprises applying a current pulse between a write electrode of the controllable resistive element and the shared read/write electrode of the controllable resistive element to decrease the charge carrier ion concentration by the determined difference.

3. The method of claim 1, wherein applying the positive or negative current pulse comprises applying a current pulse between a write electrode of the controllable resistive element and the shared read/write electrode of the controllable resistive element to increase the charge carrier ion concentration by the determined difference.

4. The method of claim 1, wherein applying the positive or negative pulse causes charge carrier ions to move from or to a reservoir layer.

5. The method of claim 1, wherein the resistor layer is formed from a lithium-containing material.

6. The method of claim 5, wherein the lithium-containing material is selected from the group consisting of $LiCoO_2$, $LiNbO_3$, $LiMnO_2$, $LiV_2O_5$, $LiFePO_4$, $LiNi_xMn_yCo_z$, $V_2O_5$—$LiBO_2$, $Li_4Ti_5O_{12}$, $Li_xAl$, $Li_xC$, and $Li_xSi$.

7. The method of claim 1, wherein the electrolyte layer is formed from a material selected from the group consisting of lithium phosphorous oxy-nitride and an organic material-based electrolyte.

8. The method of claim 1, wherein applying the positive or negative current pulse to the controllable resistive element causes charge carrier ions to travel from or to a reservoir layer.

9. The method of claim 8, wherein the reservoir layer is formed from a lithium compound material selected from the group consisting of $LiCoO_2$, $LiNbO_3$, $LiMnO_2$, $LiV_2O_5$, $LiFePO_4$, $LiNi_xMn_yCo_z$, $V_2O_5$—$LiBO_2$, $Li_4Ti_5O_{12}$, $Li_2TiO_3$, $Li_xAl$, $Li_xC$, Li, and $Li_xSi$.

\* \* \* \* \*